United States Patent
Hoffman et al.

(10) Patent No.: US 9,435,690 B2
(45) Date of Patent: Sep. 6, 2016

(54) ULTRA-VIOLET FLAME DETECTOR WITH HIGH TEMPERATURE REMOTE SENSING ELEMENT

(75) Inventors: Alan Rex Hoffman, Chesterland, OH (US); Fred Yu-Feng Chou, Stow, OH (US); Frederick Louis Glesius, Brecksville, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 763 days.

(21) Appl. No.: 13/488,731

(22) Filed: Jun. 5, 2012

(65) Prior Publication Data
US 2013/0318994 A1 Dec. 5, 2013

(51) Int. Cl.
| | |
|---|---|
| F23N 5/08 | (2006.01) |
| G01J 5/00 | (2006.01) |
| G01J 5/04 | (2006.01) |
| G01J 5/02 | (2006.01) |
| G01J 1/42 | (2006.01) |
| F23M 11/04 | (2006.01) |
| G01J 5/08 | (2006.01) |

(52) U.S. Cl.
CPC ........... *G01J 5/0088* (2013.01); *F23M 11/045* (2013.01); *F23N 5/082* (2013.01); *G01J 1/429* (2013.01); *G01J 5/0014* (2013.01); *G01J 5/025* (2013.01); *G01J 5/0285* (2013.01); *G01J 5/045* (2013.01); *F23N 5/08* (2013.01); *F23N 2029/00* (2013.01); *F23N 2031/06* (2013.01); *G01J 5/0806* (2013.01); *G01J 5/0875* (2013.01); *Y02T 50/677* (2013.01)

(58) Field of Classification Search
CPC .... F23N 5/082; F23N 5/242; F23N 2029/00; F23N 2029/16; F23N 2031/28; F23N 2031/46
USPC ................... 60/39.091, 773, 793; 431/78, 79
See application file for complete search history.

(56) References Cited

U.S. PATENT DOCUMENTS 3,185,846 A * 5/1965 Gilbert et al. ................ 250/372
3,212,261 A * 10/1965 Rose ......................... F02C 9/16
60/39.281

(Continued)

FOREIGN PATENT DOCUMENTS

| CN | 101807336 A | 8/2010 |
|---|---|---|
| CN | 201867370 U | 6/2011 |

(Continued)

OTHER PUBLICATIONS

Unofficial English translation of Office Action issued in connection with corresponding CN Application No. 201310220267.7 on Feb. 29, 2016.

*Primary Examiner* — Phutthiwat Wongwian
*Assistant Examiner* — Eric Linderman
(74) *Attorney, Agent, or Firm* — Cooper Legal Group, LLC

(57) ABSTRACT

A flame sensor apparatus is provided including a sensor assembly for sensing characteristics of a flame within a combustion chamber. The flame sensor apparatus further includes an electrical assembly that is electrically remote from the sensor assembly. In addition, a cable assembly extends between the sensor assembly and the electrical assembly. The cable assembly can convey the characteristics of the flame from the photodiode to the electrical assembly. The cable assembly is included as part of a sealed array filled with an inert gas. In addition, a method of sensing characteristics of a flame is also provided.

20 Claims, 5 Drawing Sheets

(56) References Cited

U.S. PATENT DOCUMENTS

| | | | | |
|---|---|---|---|---|
| 3,280,882 A * | 10/1966 | Hemker | | 431/79 |
| 3,689,773 A * | 9/1972 | Wheeler | | 250/554 |
| 3,824,391 A * | 7/1974 | Noltingk | | F23N 5/082 |
| | | | | 250/208.6 |
| 3,958,126 A * | 5/1976 | Bryant | | 250/554 |
| RE29,143 E * | 2/1977 | Bianchini | | F23N 5/082 |
| | | | | 340/507 |
| 4,039,844 A * | 8/1977 | MacDonald | | F23N 5/082 |
| | | | | 250/214 AG |
| 4,220,857 A * | 9/1980 | Bright | | 250/339.15 |
| 4,913,647 A * | 4/1990 | Bonne et al. | | 431/12 |
| 5,384,467 A * | 1/1995 | Plimon | | F02B 77/085 |
| | | | | 250/227.2 |
| 5,487,266 A * | 1/1996 | Brown | | 60/776 |
| 5,488,355 A * | 1/1996 | Tindall | | F23N 5/082 |
| | | | | 250/339.15 |
| 5,659,133 A * | 8/1997 | Sims | | G01M 15/10 |
| | | | | 313/323 |
| 5,670,784 A * | 9/1997 | Cusack et al. | | 250/372 |
| 5,755,819 A * | 5/1998 | Bonanni | | F23N 5/082 |
| | | | | 431/12 |
| 5,857,845 A * | 1/1999 | Paciorek | | 431/74 |
| 5,978,525 A * | 11/1999 | Shu et al. | | 385/12 |
| 6,013,919 A | 1/2000 | Schneider et al. | | |
| 6,244,856 B1 * | 6/2001 | Winnington | | F23D 14/14 |
| | | | | 126/92 C |
| 6,473,705 B1 * | 10/2002 | Conners | | G01F 1/661 |
| | | | | 250/343 |
| 6,599,028 B1 * | 7/2003 | Shu et al. | | 385/80 |
| 7,229,278 B1 * | 6/2007 | Newberry | | 431/79 |
| 7,334,413 B2 * | 2/2008 | Myhre | | 60/803 |
| 7,441,411 B2 * | 10/2008 | Gleeson | | F23N 5/242 |
| | | | | 60/39.091 |
| 7,987,712 B2 * | 8/2011 | Myhre | | F23M 11/045 |
| | | | | 239/74 |
| 8,430,666 B1 * | 4/2013 | Clevenger | | F23N 5/08 |
| | | | | 340/578 |
| 8,456,634 B2 * | 6/2013 | McManus | | F02C 9/00 |
| | | | | 356/432 |
| 9,068,747 B2 * | 6/2015 | Huang | | F23N 5/082 |
| 2001/0035952 A1 * | 11/2001 | Merklein | | 356/239.2 |
| 2005/0266363 A1 * | 12/2005 | Ganeshan | | 431/79 |
| 2006/0059917 A1 * | 3/2006 | Plimpton | | F01D 17/08 |
| | | | | 60/772 |
| 2006/0088793 A1 * | 4/2006 | Brummel et al. | | 431/13 |
| 2007/0207423 A1 * | 9/2007 | Chase | | F23N 5/082 |
| | | | | 431/79 |
| 2007/0281260 A1 * | 12/2007 | McLellan | | F23N 5/082 |
| | | | | 431/79 |
| 2008/0289342 A1 * | 11/2008 | Sappey | | F01D 21/003 |
| | | | | 60/793 |
| 2009/0049894 A1 * | 2/2009 | Wilbraham | | F02B 77/085 |
| | | | | 73/112.01 |
| 2010/0071375 A1 * | 3/2010 | Myhre | | 60/740 |
| 2010/0220182 A1 * | 9/2010 | Krull et al. | | 348/83 |
| 2010/0332103 A1 * | 12/2010 | Dean | | F02C 9/28 |
| | | | | 701/100 |
| 2011/0296844 A1 * | 12/2011 | Widener | | F02C 7/22 |
| | | | | 60/780 |
| 2012/0279230 A1 * | 11/2012 | Botarelli | | F02C 9/00 |
| | | | | 60/773 |
| 2013/0273483 A1 * | 10/2013 | Spalding | | G01J 5/0821 |
| | | | | 431/79 |
| 2014/0124235 A1 * | 5/2014 | Blakemore | | 174/50.5 |
| 2014/0124260 A1 * | 5/2014 | Blakemore et al. | | 174/652 |
| 2014/0216155 A1 * | 8/2014 | Olechnowicz et al. | | 73/431 |

FOREIGN PATENT DOCUMENTS

| | | | |
|---|---|---|---|
| CN | 201964955 U | 9/2011 | |
| EP | 0816760 A1 * | 7/1998 | |
| EP | 0942232 A2 * | 1/1999 | F23N 5/08 |

* cited by examiner

ULTRA-VIOLET FLAME DETECTOR WITH HIGH TEMPERATURE REMOTE SENSING ELEMENT

BACKGROUND OF THE INVENTION

1. Field of the Invention

The invention relates to a flame sensor and, more particularly, to a flame sensor for sensing characteristics of a flame in a combustion chamber.

2. Discussion of Prior Art

Within an oil or gas fueled turbine (combustion chamber), fuel is fed into a combustion chamber within which an ignition flame is present. If the flame becomes extinguished, commonly referred to as a flame-out condition, it is undesirable for fuel to continue to be fed into the hot combustion chamber without appropriate ignition. Consequently, if the ignition flame is extinguished within the combustion chamber, the fuel feed into the combustion chamber should be quickly terminated and thus limit un-combusted fuel build up.

A flame sensor is generally used for detecting the presence or absence of an ignition flame within a combustion chamber of a gas turbine. Also, flame sensing electronics are commonly associated with the flame sensor within the turbine arrangement. The flame sensing electronics may be temperature sensitive. Due to the relatively hot temperatures in and near the combustion chamber, water cooling is often used to cool the temperature sensitive flame sensing electronics. However, water may occasionally leak and, if sprayed on the relatively hot housing of the turbine, may cause the turbine housing to contract, causing damage to the turbine. Accordingly, it would be useful to provide a flame sensor that eliminates the need for water cooling and which the circuitry is electrically remote from the relatively high temperature near the combustion process/chamber.

BRIEF DESCRIPTION OF THE INVENTION

The following summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

In accordance with one aspect, the present invention provides a flame sensor apparatus. The flame sensor apparatus includes a sensor assembly including a photodiode for sensing characteristics of a flame within a combustion chamber. The flame sensor apparatus further includes an electrical assembly that is electrically remote from the sensor assembly. The flame sensor apparatus also includes a cable assembly extending between the sensor assembly and the electrical assembly. The cable assembly can convey the characteristics of the flame from the photodiode to the electrical assembly.

In accordance with another aspect, the present invention provides a flame sensor apparatus. The flame sensor apparatus includes a sensor assembly including a photodiode for sensing characteristics of a flame within a combustion chamber. The flame sensor apparatus further includes an electrical assembly that is electrically remote from the sensor assembly and the combustion chamber. The flame sensor apparatus further includes a cable assembly extending between the sensor assembly and the electrical assembly. The cable assembly can convey the characteristics of the flame from the photodiode to the electrical assembly. The cable assembly is included as part of a sealed array filled with an inert gas.

In accordance with another aspect, the present invention provides a method of sensing characteristics of a flame within a combustion chamber. The method includes the steps of receiving electromagnetic radiation from the flame with a photodiode. The method further includes the step of producing a photocurrent corresponding to the electromagnetic radiation with the photodiode. The method further includes the step of conveying the photocurrent with a cable assembly to an electrical assembly that is electrically remote from the photodiode and the combustion chamber. The method further includes the step of sensing the characteristics of the flame with the electrical assembly based on the photocurrent.

BRIEF DESCRIPTION OF THE DRAWINGS

The foregoing and other aspects of the invention will become apparent to those skilled in the art to which the invention relates upon reading the following description with reference to the accompanying drawings, in which.

DETAILED DESCRIPTION OF THE INVENTION

Figure 1:
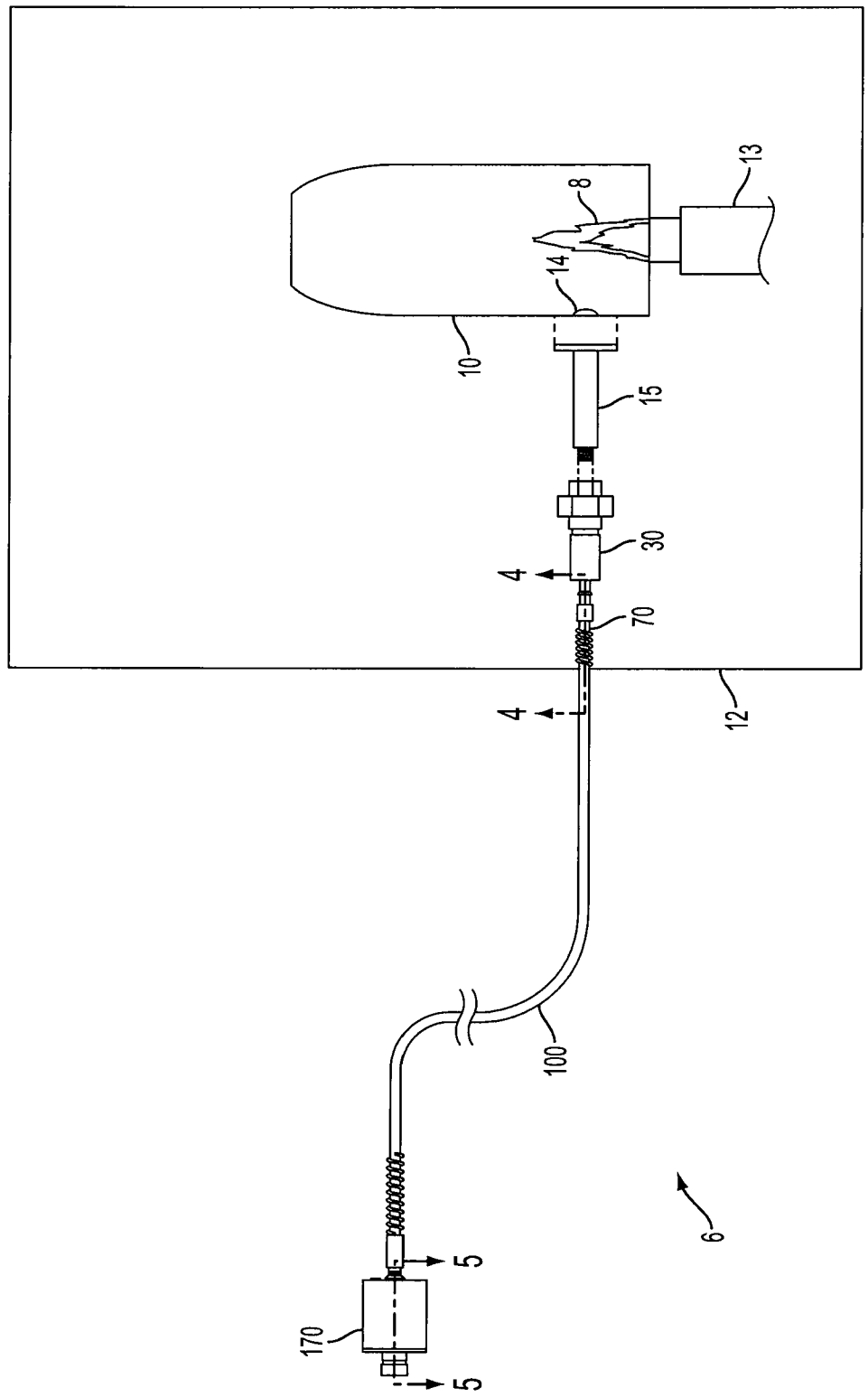
FIG. 1 is a partially exploded, schematized cross-section view of an example flame sensor apparatus in accordance with at least one aspect of the present invention.

Example embodiments that incorporate one or more aspects of the invention are described and illustrated in the drawings. These illustrated examples are not intended to be a limitation on the invention. For example, one or more aspects of the invention can be utilized in other embodiments and even other types of devices. Moreover, certain terminology is used herein for convenience only and is not to be taken as a limitation on the invention. Still further, in the drawings, the same reference numerals are employed for designating the same elements.

FIG. 1 schematically illustrates an example flame sensor apparatus 6 for monitoring specific characteristics of a flame 8. The flame 8 is located within a combustion chamber 10 of a turbine 12 and emits electromagnetic radiation energy. A sight tube 15 having a hollow internal bore can be attached to the combustion chamber 10. A sensor assembly 30 is operably connected with the combustion chamber 10 and can receive the electromagnetic radiation energy from the flame 8 through the sight tube 15. The sensor assembly 30 includes a photodiode, which generates a current, such as a photocurrent, based on the electromagnetic radiation energy. This current can then pass from the sensor assembly 30, through a cable assembly 100, and to an electrical assembly 170, whereupon the electrical assembly 170 can determine the flame's characteristics, such as the presence or absence of the flame. In accordance with an aspect of the present invention, the electrical assembly 170 can be electrically remote from the photodiode 60 (shown in FIG. 3). As such, the electrical assembly 170 monitors the flame's characteristics while being located in a relatively cooler environment away from the combustion chamber 10 and turbine 12 and heat associated with the flame of combustion.

Turning to the specific example shown in FIG. 1, the turbine 12 can include rotating turbine blades (not shown) powered by fuel combustion within the combustion chamber 10. The turbine 12 is generically/schematically shown in FIG. 1 to convey the concept that the turbine 12 can include a number of different structures and/or could be used in varied, different applications. For example, the turbine 12 could be constructed/configured for oil and gas combustion turbines and used in applications such as for aircraft propulsion, marine propulsion, land-based power generation, off shore power generation, or the like. In one particular example, the turbine 12 and flame sensor apparatus 6 can be used in jet aircraft engines. As such, it is to be appreciated that the turbine 12 in FIG. 1 is not intended to be limiting on further examples.

The combustion chamber 10 can be positioned within the turbine 12. The combustion chamber 10 can define a substantially hollow internal area. It is to be understood that the combustion chamber 10 is generically/schematically represented in FIG. 1, and is not intended to be limiting on further examples. For instance, the generic representation of the combustion chamber 10 is intended to convey the concept that the combustion chamber 10 can represent a number of different constructions, some of which may be generally known. Similarly, the combustion chamber 10 described herein and as in association with the turbine 12 discussed above may be incorporated into a number of different applications.

A fuel nozzle 13 can be provided that delivers fuel (e.g., air, fuel, air/fuel mixture, combustible materials, etc.) into the combustion chamber 10. The fuel nozzle 13 can cooperate with an opening, orifice, or the like in the combustion chamber 10 such that the fuel nozzle 13 can deliver the fuel from an exterior location into the combustion chamber 10. As such, the fuel nozzle 13 can deliver the fuel into the combustion chamber, whereupon the fuel can be ignited with the flame 8. Ignited fuel within the combustion chamber 10 produces a relatively high-pressure gas. Again, the fuel nozzle 13 is generically/schematically represented in the shown example, and may include any number of fuel nozzle constructions that may be known. Further, the fuel nozzle 13 could be positioned at a number of locations within the combustion chamber 10, and is not limited to the location shown in FIG. 1.

An opening 14 can be provided in an outer wall of the combustion chamber 10. The opening 14 (shown generically in FIG. 1 and in phantom in FIG. 2, as opening 14 is not normally visible in such a view), can extend completely through the outer wall. As such, an interior of the combustion chamber 10 can be optically exposed to a location that is exterior from the combustion chamber 10. The opening 14 can be positioned in near proximity to the flame 8, such that the opening 14 defines an optical path through the opening 14 and towards the flame 8. The temperature adjacent the opening 14 can, in one example, be about 454° C., though a wide range of temperatures are contemplated. It is to be understood that the opening 14 is not limited to the location shown in FIG. 1, and could be positioned at a number of different locations on the combustion chamber 10.

Figure 2:
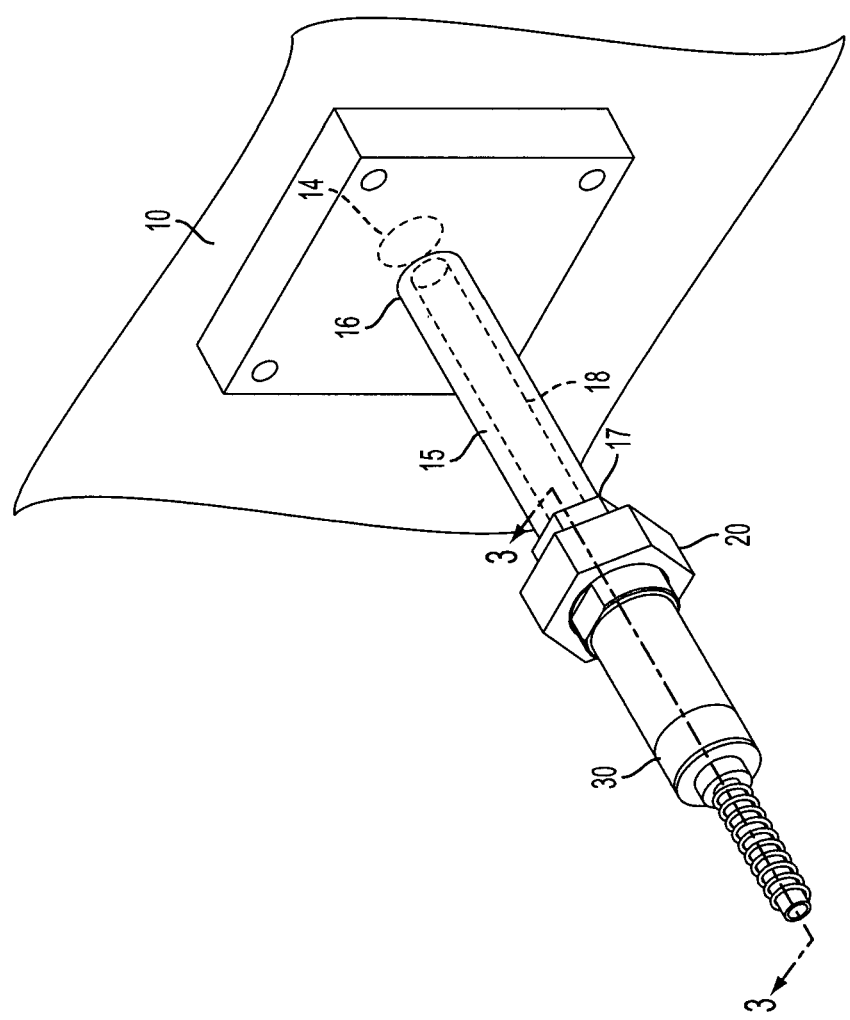
FIG. 2 is a perspective view of an example sensor assembly including an example sight tube in accordance with an aspect of the present invention.

The sight tube 15 is located in the optical path from the flame 8 and through the opening 14. FIGS. 1 and 2 depict an exploded view of the sight tube 15 for illustrative purposes to show the structural relationship between the sight tube 15 and the opening 14. It is to be understood, however, that in operation, the sight tube 15 and combustion chamber 10 are in a fully assembled state with the sight tube attached to the combustion chamber 10. The sight tube 15 can be attached to the combustion chamber 10 in any number of ways, such as by mechanical fasteners, welding, adhesives, or the like.

Referring now to FIG. 2, the sight tube 15 can be explained in more detail. The sight tube 15 includes an elongated, substantially hollow cylindrical structure that extends between a first end portion 16 and an opposing second end portion 17. The sight tube 15 includes a variety of sizes and shapes, though in one example, the sight tube 15 can be approximately 152.4 millimeters (6 inches) in total length. The sight tube 15 defines an internal bore 18 that is substantially hollow and extends longitudinally between the first end portion 16 and the second end portion 17. The internal bore 18 of the sight tube 15 is shown in phantom in FIG. 2, as the internal bore 18 is not normally visible in such a view. The internal bore 18 is not limited to the size and shape shown in FIG. 2, and, in other examples, could include a larger or smaller cross-sectional diameter. The sight tube 15 is attached to the opening 14, such that an interior of the combustion chamber 10 is optically exposed to the internal bore 18 of the sight tube 15. In operation, the internal bore 18 of the sight tube 15 can be aligned with the opening 14, such that the sight tube 15 defines an optical path through the internal bore 18, through the opening 14, and into the interior area of the combustion chamber 10. As such, electromagnetic radiation energy from the flame 8 propagates through the internal bore 18 of the sight tube 15.

Figure 3:
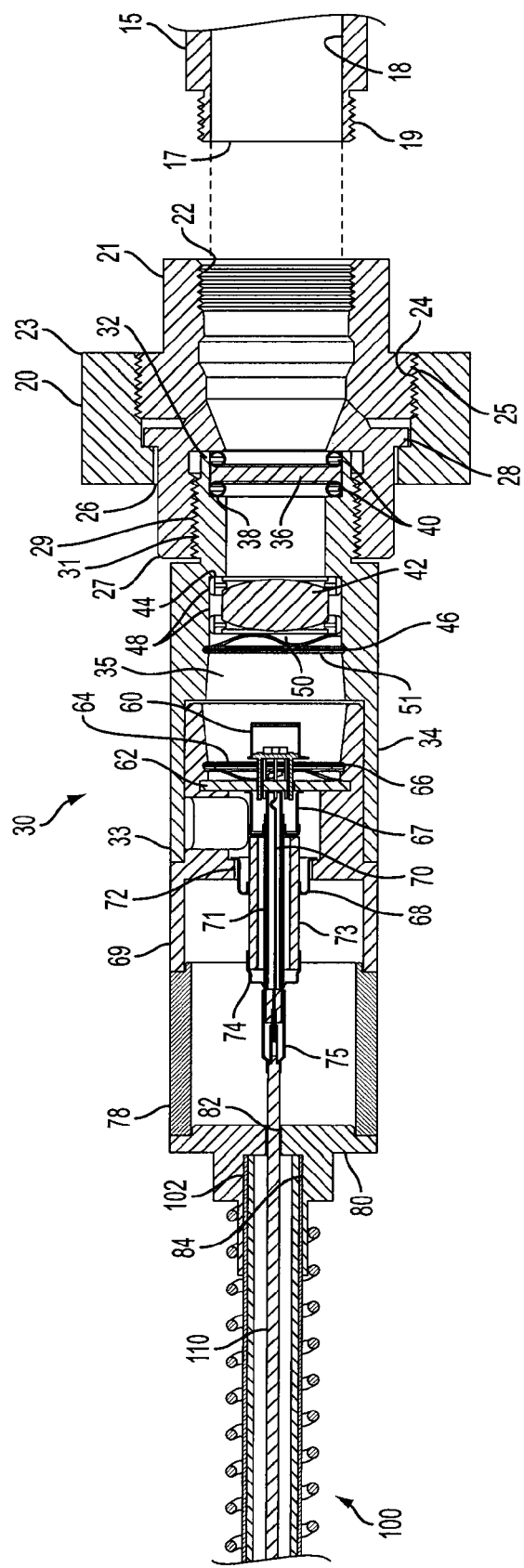
FIG. 3 is a partially exploded sectional view of the example sensor assembly along lines 3-3 of FIG. 2.

Referring now to FIG. 3, a cross-sectional view along line 3-3 of FIG. 2 is shown, depicting the second end portion 17 of the sight tube 15. The sight tube 15 can include an attachment structure, such as a threaded portion or a screw thread 19, positioned at the second end portion 17. It is to be understood that the sight tube 15 could include any number of attachment structures, and is not limited to the screw thread 19 shown in FIG. 3. In one example, the screw thread 19 can be formed at an outer surface of the second end portion 17 of the sight tube 15, so as to form an external male thread.

The sight tube 15 is attached at the second end portion 17 to a union nut 20. It is to be understood that FIG. 3 depicts an exploded view of the sight tube 15 for illustrative purposes. However, in operation, the sight tube 15 is in a fully assembled state and is attached to the union nut 20 in a similar manner as shown in FIG. 2. In particular, the sight tube 15 can be attached to a first nut end portion 21 of the union nut 20. The first nut end portion 21 defines a rounded, cylindrically shaped structure with a hollow internal bore extending between a first end and a second end. The first nut end portion 21 includes an attachment structure, such as a threaded portion 22. The threaded portion 22 is formed at an inner surface of the internal bore of the first nut end portion 21. As such, the screw thread 19 of the sight tube 15 is sized and shaped to mate with the threaded portion 22 of the first nut end portion 21. Of course, it is to be appreciated that other attachment means are envisioned for attaching the first nut end portion 21 and the sight tube 15, such as welding, mechanical fasteners, adhesives, etc.

The union nut 20 can now be described in more detail. The first nut end portion 21 includes a second attachment structure positioned at an opposite end from the threaded portion 22. In one example, the first nut end portion 21 includes an external threaded portion 24 formed on an outer surface of the first nut end portion 21.

The union nut 20 further includes a central nut portion 23. The central nut portion 23 includes a hollow internal bore extending between opposing end portions. The internal bore of the central nut portion 23 includes a diameter that is slightly larger than an outer diameter at the threaded portion 22 of the first nut end portion 21. The central nut portion 23 has an internal threaded portion 25 positioned adjacent an end of the central nut portion 23.

The central nut portion 23 is attached to the first nut end portion 21. For example, the internal threaded portion 25 of the central nut portion 23 is sized and shaped to mate with the external threaded portion 24 of the first nut end portion 21. As such, the external threaded portion 24 of the first nut end portion 21 can engage and mate with the internal threaded portion 25. Accordingly, the first nut end portion 21 can be removably attached to the central nut portion 23. It is to be understood that the attachment of the first nut end portion 21 and the central nut portion 23 described herein is merely one possible example of an attachment means, as any number of attachment means are envisioned.

The central nut portion 23 further includes an inward protrusion 26 that projects inwardly from an outer surface of the central nut portion 23. The inward protrusion 26 is positioned at an opposite end of the central nut portion 23 from the end having the internal threaded portion 25. The inward protrusion 26 can include an inner diameter that is smaller than the diameter of the remaining portion of the central nut portion 23.

The union nut 20 further includes a second nut end portion 27. The second nut end portion 27 defines a substantially cylindrically shaped structure having a hollow internal bore extending between opposing end portions. The second nut end portion 27 includes a nut projection 28 projecting radially outwardly from an outer surface of the second nut end portion 27. The nut projection 28 is sized and shaped to be held by the inward protrusion 26. As such, the nut projection is limited from moving radially and axially by the first nut end portion 21.

The second nut end portion 27 further includes a nut groove 29. The nut groove 29 extends circumferentially around the internal wall of the second nut end portion 27 to form an internal threaded portion. The nut groove 29 can attach the union nut 20 to the sensor assembly 30. In particular, the sensor assembly 30 includes a projection 31 formed at an outer surface of the sensor assembly 30. The projection 31 includes a threaded portion extending circumferentially around an outer surface of the projection 31. In operation, the projection 31 can be received within the nut groove 29 in a threading manner to attach the sensor assembly 30 to the union nut 20. The nut groove 29 can be sized to match the projection 31, such that the nut groove 29 can have a slightly larger diameter than the projection 31. As such, the internal threaded portion of the nut groove 29 can receive the threaded portion of the projection 31 in a threaded manner, such that the projection 31 is limited from either or both axial and radial movement.

Referring still to FIG. 3, the sensor assembly 30 can now be described in more detail. Due to the attachment of the sensor assembly 30 to the sight tube 15 via the union nut 20, the sensor assembly 30 is spaced a distance away from the combustion chamber 10. For instance, the sensor assembly 30 could be spaced about 152.4 millimeters (6 inches) away from the combustion chamber 10, though larger or smaller distances are contemplated. By being spaced away from the combustion chamber 10, the sensor assembly 30 is subjected to relatively lower temperatures than the sight tube 15. For instance, the temperature at a first end portion 32 can be in a range of about −55° C. to about 371° C. However, the temperature can be lower at downstream locations of the sensor assembly 30, such as in the range of about −55° C. to about 200° C.

The sensor assembly 30 includes a sensor body 34 extending along a substantially longitudinal axis. The sensor body 34 can be constructed of a number of materials, including relatively high temperature materials that can withstand the aforementioned temperatures associated with the combustion process. In further examples, the sensor body 34 is constructed of materials that can withstand even higher temperatures than described herein. The sensor body 34 is formed of any number of metal-like materials that may be resistant to corrosion, and may include 304 stainless steel, 316 stainless steel, or the like.

The sensor body 34 defines an internal sensor chamber 35 that is substantially hollow and extends axially along the length of the sensor body 34 between the first end portion 32 and the second end portion 33. The sensor body 34 extends along a longitudinal axis that is substantially coaxial with a longitudinal axis of the sight tube 15 and the union nut 20. As such, the internal sensor chamber 35 of the sensor body 34 is substantially coaxial with the internal bore 18 of the sight tube 15 and the opening 14. Accordingly, an optical path can extend through the sensor body 34, through the sight tube 15, and towards the flame 8. As such, the electromagnetic radiation energy can propagate from the flame 8, through the opening 14 and sight tube 15, and into the sensor body 34 of the sensor assembly 30.

The internal structure of the sensor assembly 30 can now be described beginning near the first end portion 32. The sensor assembly 30 includes a window 36 positioned within the internal sensor chamber 35 of the sensor body 34. The window 36 is positioned adjacent the first end portion 32 of the sensor body 34. The window 36 can be oriented substantially perpendicularly with respect to the longitudinal axis of the sensor body 34, such that the window 36 extends radially across the internal sensor chamber 35. The window 36 can include a variety of different materials, but, in one example, includes a sapphire material.

The window 36 can be positioned within a window groove 38 formed in an internal surface of the internal sensor chamber 35. The window groove 38 extends circumferentially around the internal surface of the internal sensor chamber 35. The window groove 38 can have a larger diameter than neighboring portions of the internal sensor chamber 35. The window 36 has a diameter that is slightly smaller than the window groove 38, such that the window 36 closely abuts the window groove 38. It is to be understood that the window groove 38 and the window 36 are not limited to the size and shape in the example. Rather, the window groove 38 could include a non-circular shape, such as a spherical shape, rectangular shape, or the like. Similarly, the window 36 could also include a shape that matches the shape of the window groove 38, such that the window 36 could also be non-circular.

The window 36 can be positioned between one or more seals. In the shown example, the seals include a pair of sealing washers 40, though, a variety of seals are envisioned. The window 36 can be positioned between the sealing washers 40. The sealing washers 40 include a circularly shaped structure having an internal bore extending axially through a center of the sealing washers 40. The sealing washers 40 can be formed of a number of different materials, including metal-like materials, elastomer-like materials, etc.

In further examples, the sealing washers 40 could include materials that can withstand the relatively high temperature that the sensor assembly 30 is subjected to.

The sealing washers 40 include a diameter that is slightly smaller than a diameter of the window groove 38, such that the sealing washers 40 are received within the window groove 38 and are limited from moving axially along the length of the sensor body 34. In one example, to further limit movement, the sealing washers 40 could be brazed to either or both of the window 36 and the window groove 38. Accordingly, the window 36 is limited from moving axially along the length of the sensor assembly by the sealing washers 40. In further examples, the sealing washers 40 are internally energized and form a seal with the window 36 and the sensor body 34. In this example, the window 36 and sealing washers 40 form a seal that forms a pressure barrier. For instance, the window 36 and sealing washers 40 can withstand gas temperatures of a relatively high temperature, such as in the range of about 850° F., and pressures reaching at least 300 lbs/in$^2$. As such, the window 36 and sealing washers 40 can, together, function as a protective sealing barrier that separates an upstream volume (i.e., from the combustion chamber 10, through the sight tube 15 and union nut 20, and to the window 36) from a downstream volume (i.e., from the window 36 towards the second end portion 33). Accordingly, in this example, the window 36 and internally energized sealing washers 40 can function to shield and/or protect the downstream volume from the relatively high temperature and pressure in the combustion chamber 10.

Further downstream from the window 36, the sensor assembly 30 can include a lens 42. The lens 42 can be positioned downstream from the window 36. The lens 42 can be positioned between the window 36 and the second end portion 33 of the sensor body 34. The lens 42 can be located within the internal sensor chamber 35 of the sensor body 34. The lens 42 can be oriented substantially perpendicularly with respect to the longitudinal axis of the sensor body 34, such that the lens 42 extends radially across the internal sensor chamber 35. The lens 42 can include a number of different types of lenses, such as a biconvex lens, plano-convex lens, or the like. Furthermore, the lens 42 can include a fused silica lens. The lens 42 can be formed of a number of different materials, however, that can withstand the relatively high temperature, pressure, and vibratory environment that the sensor assembly 30 can encounter. As will be discussed in more detail below, the lens 42 can focus the electromagnetic radiation energy from the flame towards the second end portion 33.

Lens washers 48 support the lens 42. The shown example of FIG. 3 includes two metal washers, however, it is to be understood, more or fewer washers are envisioned. The lens washers 48 are positioned on opposing sides of the lens 42, such that the lens 42 is substantially sandwiched between the lens washers 48. The lens washers 48 can have a generally circular shape with an internal bore extending through a center. The lens washers 48 can be formed of a number of different materials, including metal-like materials. In one example, one of the lens washers 48 are positioned upstream from the lens 42 between the lens 42 on one side and an internal ledge 44 on an opposing side. The lens washers 48 can, in one example, be brazed and/or welded to the sensor body 34, such that the lens 42 is limited from moving axially along the length of the sensor body 34.

The sensor assembly 30 further includes a wave spring 50. The wave spring 50 supports the lens 42. The wave spring 50 is positioned adjacent one of the lens washers 48 on a downstream side of the lens 42. The wave spring 50 allows for the lens 42 to move axially a limited distance to accommodate for the relatively high vibration endured near the combustion chamber 10. The wave spring 50 is not limited to the size, shape, and location of the example shown in FIG. 3. Rather, the wave spring 50 could instead be positioned upstream and in front of the lens 42, such that the wave spring 50 is positioned between the lens 42 and the window 36.

The sensor assembly 30 further includes a retaining ring 51. The retaining ring is received within an indentation 46 formed within an interior surface of the sensor body 34. Of course, the retaining ring 51 could be secured in other ways within the sensor assembly 30, such as with mechanical fasteners, adhesives, or the like. The retaining ring 51 can be positioned downstream and adjacent the wave spring 50. As such, retaining ring 51 can limit axial movement of the wave spring 50 in a direction away from the lens 42.

The sensor assembly 30 further includes a wire housing 69. The wire housing 69 defines a substantially hollow tube attached to the second end portion 33 of the sensor body 34. The wire housing 69 can be attached to the sensor body 34 in any number of ways, such as by welding, mechanical fasteners, etc. The wire housing 69 includes a substantially hollow bore extending therethrough to allow for wires, or the like to pass through the wire housing 69. The wire housing 69 can further include an opening 72 extending axially through the wire housing 69. The opening 72 is positioned towards a center of the wire housing 69 and, as will be described in more detail below, allows for electronics such as cables, wires, etc. to pass through the wire housing 69.

The sensor assembly 30 further includes a photodiode 60 positioned downstream from the lens 42 within the wire housing 69. The photodiode 60 includes a solid state ultraviolet sensor that receives the focused electromagnetic radiation energy through the lens 42. The photodiode 60 can be square shaped and is about 1.4 millimeters long diagonally. In one example, the lens 42 focuses light, including the electromagnetic radiation energy, onto a spot on the photodiode 60 that is about 1.7 millimeters+/−0.08 millimeters in diameter. Of course, it is understood that a variety of photodiodes can be used in the sensor assembly 30, such that the photodiode 60 is not limited to the aforementioned dimensions. In one example, the photodiode 60 can include a silicon carbide photodiode.

The photodiode 60 receives the electromagnetic radiation energy and generates a current output signal, such as a photocurrent, based on the electromagnetic radiation energy. As is generally known, the electromagnetic radiation energy includes ultraviolet (UV) radiation that has a wavelength in a range from about 10 nm to about 400 nm. The photodiode 60 can generate a photocurrent that is proportional to the intensity level of the UV radiation received within a specific spectral bandwidth. The photocurrent can be relatively low, such as in a range of about $10^{-10}$ amperes. In one example, the photodiode 60, including the silicon carbide photodiode, can have a spectral response in a range of from about 190 nanometers (nm) to about 400 nm. As such, the photodiode 60 has a relatively broad spectral response that covers a 310 nm peak of the flame 8, thus allowing for a relatively reliable detection of the 310 nm emission of the flame 8. By having a high end spectral response cutoff (400 nm in this example), the photodiode 60 can therefore be "blind" to potential interfering blackbody radiation from the walls of the combustion chamber 10. In one example, the current output signal, which may include a signal, can be delivered from the photodiode and be conditioned and supplied to a control system. In response, the signal can be used to trigger a shut off of fuel to the combustion chamber.

The photodiode 60 is mounted to a circuit board 62. As is generally known, the circuit board 62 is electrically connected to the photodiode 60. In the shown example, the circuit board 62 extends radially across wire housing 69. The circuit board 62 can be supported at an outer circumferential edge by the wire housing 69. The circuit board 62 can be supported in any number of ways, such as through adhesives, mechanical fasteners, snap fit means, etc. As such, the circuit board 62 is generally limited from move axially and/or radially with respect to the wire housing 69.

The photodiode 60 and circuit board 62 are further supported by a wave spring 64. The wave spring 64 can be similar and/or identical to the wave spring 50 that supports the lens 42. Here, the wave spring 64 is positioned adjacent the circuit board 62. The wave spring 64 allows for the circuit board 62 to move axially a limited distance to accommodate for relatively high vibrations endured near the combustion chamber 10. Of course, the wave spring 64 is not limited to the example shown in FIG. 3, and, instead, could be positioned upstream or downstream from the photodiode 60. In this example, the wave spring 64 is supported within an indentation 66 formed in the wire housing 69. In particular, the indentation 66 defines a groove, slot, etc. into which the wave spring 64 is received. In further examples, however, the wave spring 64 could be supported in any number of ways, such as by adhesives, mechanical fasteners, or the like.

The wire housing 69 can include a shield housing 67. The shield housing 67 defines a substantially hollow structure having an axial bore extending therethrough. The shield housing 67 can be attached to the circuit board 62 on an opposite side from the photodiode 60. The shield housing 67 can, in one example, have a generally cylindrical shape, though any number of shapes are envisioned.

The sensor assembly 30 can further include a center wire 70. The center wire 70 can be attached (e.g., electrically connected) to the circuit board 62. The center wire 70 can receive the photocurrent from the photodiode 60. The center wire 70 can pass from the circuit board 62 and through the shield housing 67.

The sensor assembly 30 can further include an insulating tube 71. The insulating tube 71 can extend longitudinally within the wire housing 69. The insulating tube 71 can house the center wire 70, such that the center wire 70 extends substantially coaxially with the insulating tube 71. The insulating tube 71 can act as an insulator to electrically insulate the center wire 70. In a further example, the insulating tube 71 can also include a shield that substantially surrounds the insulating tube 71. In one example, the insulating tube 71, including the shield, can be attached to the shield housing 67. As such, by attaching the insulating tube 71 and the shield housing 67, the shield extending along the center wire 70 can be substantially continuous.

The sensor assembly 30 can further include an insulating structure 73. The insulating structure 73 can substantially surround the insulating tube 71 and center wire 70. The insulating structure 73 can extend substantially coaxially with both the insulating tube 71 and the center wire 70. The insulating structure 73 can extend through the opening 72 in the wire housing 69. In particular, the insulating structure 73 can be attached to the opening 72 by means of a sealing structure 68. The sealing structure 68 can extend circumferentially around the insulating structure 73 and can contact the opening 72. The sealing structure 68 can form a seal with the insulating structure 73 and the opening 72 to ensure that a sealed volume is contained within the insulating structure 73.

Moving further downstream, the sensor assembly 30 can further include a seal shield 74. The seal shield 74 can be attached at a downstream end of the insulating structure 73. The seal shield 74 can extend circumferentially around the end of the insulating structure 73 and can further provide a seal with the insulating structure 73. The seal shield 74 can be attached opposite the insulating structure 73 to a shield adapter 75. The shield adapter 75 can receive the center wire 70 and functions to attach the center wire 70 to the cable assembly 100.

Moving further downstream, the sensor assembly 30 further includes a seal adapter 78. The seal adapter 78 can be attached to the wire housing 69 opposite the sensor body 34. The seal adapter 78 includes a generally circular shape that matches (e.g., has a similar diameter) the shape of the wire housing 69 and sensor body 34. As such, the seal adapter 78 can be attached to the wire housing 69 by extending across an opening at the end of the wire housing 69. In one example, the seal adapter 78 can sealingly attach to the wire housing 69, such that a seal is formed between the seal adapter 78 and the wire housing 69. Accordingly, gas, air, moisture, humidity, etc. is limited from entering into the internal sensor chamber 35 by the seal adapter 78. The seal adapter 78 can be attached to the wire housing 69 in any number of ways, including mechanical fasteners, welding, adhesives, etc.

The sensor assembly 30 further includes a cable fitting 80 attached to the seal adapter 78. In particular, the cable fitting 80 is attached to the seal adapter 78 at an end opposite from the wire housing 69. The cable fitting 80 has a generally circular shape that matches (e.g., has a similar diameter as) the shape of the seal adapter 78. The cable fitting 80 can be attached to the seal adapter 78 in any number of ways, including by mechanical fasteners, welding, adhesives, etc. Further, the cable fitting 80 includes a cable fitting opening 82 extending through the cable fitting 80 from one side to an opposing second side. Accordingly, as will be described in more detail below, cables, wires, etc. will pass through the cable fitting opening 82.

The operation of the sensor assembly 30 can now be briefly described. Electromagnetic radiation energy is transferred from the flame 8 into the sight tube 15 before entering the sensor assembly 30. The electromagnetic radiation energy then passes through the window 36 and through the lens 42. The lens 42 focuses the electromagnetic radiation energy onto the photodiode 60. In response, the photodiode 60 generates a current output signal, such as a photocurrent, based on the electromagnetic radiation energy of the flame 8. This photocurrent is indicative of characteristics of the flame, such as the presence or absence of the flame.

Downstream from the sensor assembly 30, the flame sensor apparatus 6 further includes a cable assembly 100. A first cable end 102 is attached to the sensor assembly 30. The cable assembly 100 is in electrical communication with the photodiode 60 through the center wire 70. As such, the cable assembly 100 can convey the photocurrent that is indicative of the flame's characteristics from the photodiode 60 to a location that is electrically remote from the photodiode 60. This location can, for example, be in a relatively cooler environment than the environment near the combustion chamber 10. In one example, the cable assembly 100 can be relatively long, such as in a range of 9.1 to 10.7 meters (e.g. 30 to 35 feet). As such, the location can be cooler than the area near the sensor assembly 30, which can be near 200° C.

The cable assembly 100 further includes a coaxial cable 110 extending between opposing ends of the cable assembly 100. The coaxial cable 110 passes through the cable fitting opening 82 and is attached (e.g., electrically connected) to the center wire 70. As such, the coaxial cable 110 can receive the photocurrent from the photodiode 60 through the center wire 70. It is to be appreciated that both the coaxial cable 110 and the respective attachment to the center wire 70 are somewhat generically/schematically depicted for illustrative purposes. Indeed, the coaxial cable 110 may be electrically connected to the center wire 70 in any number of ways, including soldering, or the like.

The coaxial cable 110 functions to convey the photocurrent indicative of the characteristics of the flame 8 from the photodiode 60. The photocurrent may be susceptible to degradation while being conveyed along the cable assembly 100. This is due, at least in part, to the photocurrent being relatively small, such as in the range of about $10^{-10}$ amperes. Further, the cable assembly 100 can be relatively long, such as in a range of 9.1 to 10.7 meters (e.g. 30 to 35 feet). To accommodate for these factors, the coaxial cable 110 may include a low noise cable.

The low noise cable can include a number of different constructions. In one example, as is generally known, the low noise cable includes a center wire, such as a copper wire. The center wire transports the photocurrent along its length between opposing ends. A layer of plastic, such as polytetrafluoroethylene ("PTFE"), surrounds the center wire. In one example, a conductive or semiconductive layer has been applied for the purpose of inhibiting charge. A conductive layer, such as a carbon based conductive layer, is provided around the layer of plastic. This conductive layer helps to increase shielding, reduce static charge, and reduce electrical noise as the cable assembly 100 is moved. Lastly, an outer braid, such as copper, is provided to surround the conductive layer. It is to be appreciated that the construction of the coaxial cable 110 described herein comprises only one possible example construction, as any number of configurations are envisioned. Indeed, some or all of the aforementioned layers could be removed and/or replaced with other materials that function similarly to the low noise cable.

Figure 4:
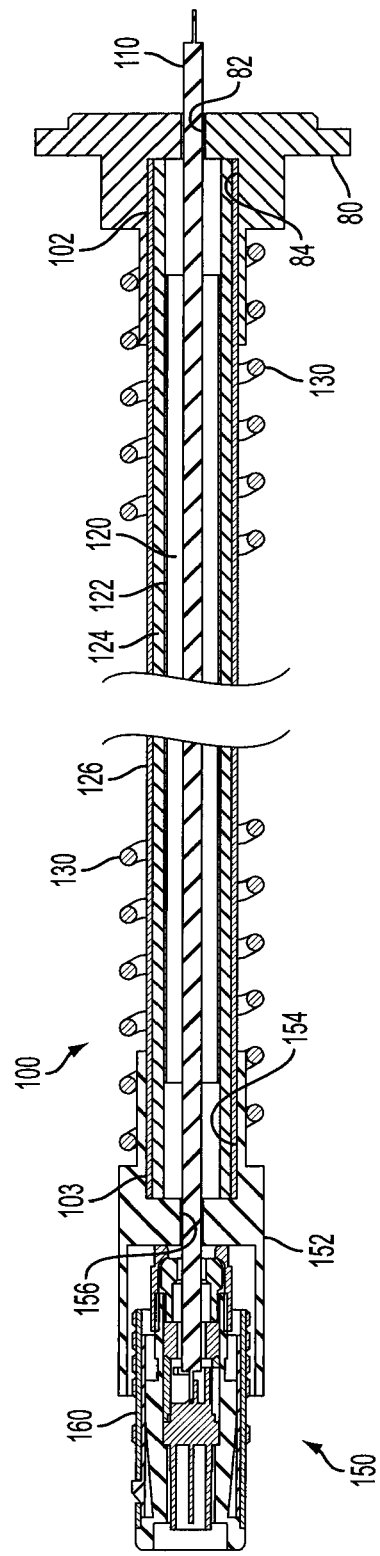
FIG. 4 is a sectional view of an example cable assembly along lines 4-4 of FIG. 1.

Referring now to FIG. 4, the structure of the cable assembly 100 will be further described. It is to be appreciated that the cable assembly 100 is somewhat generically/schematically shown for illustrative purposes. Indeed, in operation, the cable assembly 100 is generally longer in length than as shown. However, to more clearly describe features of the cable assembly 100, only end portions are shown. Further, it is to be understood that the remaining portions of the cable assembly 100 that are not shown can be similar or identical in structure to the cable assembly 100 depicted in FIG. 4.

The cable assembly 100 includes an internal volume 120 that is filled with a gas. In one example, the gas includes an inert gas, such as nitrogen, argon, etc. By filling the internal volume 120 with the gas, the coaxial cable 110 is substantially surrounded by the gas. Further, the first cable end 102 and second cable end 103 are sealed, such that the gas is limited from escaping from the internal volume 120. Accordingly, a dry atmosphere is maintained surrounding the coaxial cable 110, while humidity, moisture, etc. are limited from entering the internal volume 120. This dry atmosphere can assist in limiting the degradation of the photocurrent passing through the coaxial cable 110.

The cable assembly 100 further includes a sock layer 122. The sock layer 122 can surround the internal volume 120, such that the sock layer 122 is spaced a distance away from the coaxial cable 110. While only one sock layer is shown, it is to be appreciated that the sock layer 122 can include a plurality of sock layers. The sock layer 122 circumferentially surrounds the internal volume 120 and provides protection to the coaxial cable 110. The sock layer 122 includes a number of different materials, such as fiberglass materials, or the like.

The cable assembly 100 further includes a conduit layer 124 that circumferentially surrounds the sock layer 122. The conduit layer 124 extends substantially coaxially with the sock layer 122 and coaxial cable 110 between the first cable end 102 and second cable end 103. The conduit layer 124 can be sufficiently flexible, such that the cable assembly 100 can be moved, bent, twisted, etc. In particular, the conduit layer 124 can be formed of a flexible metal-like material, such as stainless steel. In addition to being flexible, the conduit layer 124 can provide a protective layer to the cable assembly 100, thus protecting the sock layer 122 and coaxial cable 110 from damage.

The cable assembly 100 further includes an armored braid layer 126 that surrounds the conduit layer 124. The armored braid layer 126 has a slightly larger diameter than a diameter of the conduit layer 124, such that the armored braid layer 126 circumferentially extends around the conduit layer 124. The armored braid layer 126 can be formed of a number of metal materials that allow for flexibility. Further, the armored braid layer 126 acts as a protective layer for the cable assembly 100 by limiting and/or preventing the leakage of fluids, including gas, etc., both into and out of the cable assembly 100.

The armored braid layer 126 can include any number of different materials, including stainless steel. It is to be understood that the armored braid layer 126 is designed to withstand a variety of environments, including relatively high temperature and pressure environments, such that the armored braid layer 126 can protect the coaxial cable 110. For example, the armored braid layer 126 can be designed to withstand air temperatures, such as in close proximity to the combustion chamber 10, in the range of from about −55° C. (−67° F.) to about 200° C. (392° F.). However, hotter or colder temperatures are also contemplated. Similarly, the armored braid layer 126 can be water resistant and can limit or prevent the passage of liquids, moisture, condensation, or the like through the armored braid layer 126. As such, the armored braid layer 126 can withstand periodic liquid washes that are performed on the turbine 12 with little to no fluid transport through the armored braid layer 126.

The cable assembly 100 further includes one or more coil springs 130. The coil springs are positioned at opposing ends of the cable assembly 100. For example, the first cable end 102 includes a first coil spring while the second cable end 103 includes a second coil spring. The coil springs 130 axially extend a distance away from the first cable end 102 and second cable end 103 along an outer surface of the armored braid layer 126. The coil springs 130 can provide bending/strain relief to the cable assembly 100. In particular, the coil springs 130 limit a maximum bending force at each of the first cable end 102 and second cable end 103. As such, the coil springs 130 function to reduce any excessive bending, torsion, twisting, or the like that may normally occur at the ends of the cable assembly 100. It is to be appreciated that the cable assembly 100 is not limited to the coil springs 130 shown in FIG. 4, and in further examples, could include other structures that provide a similar function. For example, any number of bending resistant items can be provided in place of the coil springs 130.

After the internal volume 120 of the cable assembly 100 has been filled with the inert gas, the cable assembly 100 can be sealed at the first cable end 102 and second cable end 103. As such, the cable assembly 100 is included as part of a sealed array. For example, the first cable end 102 is received within a sealing bore 84 of the cable fitting 80. The sealing bore 84 extends circumferentially around the first cable end 102 and extends axially a distance along the cable assembly 100. The sealing bore 84 and first cable end 102 are in contact, such that a seal is formed therebetween. In further examples, a sealing structure, such as an adhesive, mechanical fastener, weld, etc. may be provided to further attach the sealing bore 84 and first cable end 102. As such, air, gas, moisture, condensation, etc. is limited from entering the internal volume 120 of the cable assembly 100 at the first cable end 102.

Downstream from the cable assembly 100, the flame sensor apparatus 6 further includes a connector assembly 150. The connector assembly 150 is attached to the second cable end 103 of the cable assembly 100. In particular, the connector assembly 150 includes a cable fitting 152. The cable fitting 152 has a sealing bore 154 that is similar in size and shape to the sealing bore 84 of the cable fitting 80. The sealing bore 154 extends circumferentially around the second cable end 103 and extends axially a distance along the cable assembly 100. The sealing bore 154 and second cable end 103 are in contact, such that a seal is formed therebetween. In further examples, a sealing structure, such as an adhesive, mechanical fastener, weld, etc. may be provided to further attach the sealing bore 154 and second cable end 103. As such, air, gas, moisture, condensation, etc. is limited from entering the internal volume 120 of the cable assembly 100 at the second cable end 103.

The cable fitting 152 further includes a cable fitting opening 156 extending through the cable fitting 152 from one side to an opposing second side. Accordingly, the coaxial cable 110 passes through the cable fitting opening 156 and into the cable fitting 152. The coaxial cable 110 can be in sufficiently close contact with the cable fitting opening 156 such that gas, moisture, condensation, etc. is limited and/or prevented from passing through the cable fitting opening 156 and into the cable assembly 100.

The connector assembly 150 further includes an electrical connector 160. The electrical connector is attached (e.g., electrically connected) to the coaxial cable 110. The electrical connector 160 extends from the cable fitting 152 in a direction away from the cable assembly 100. As is generally known, the electrical connector 160 can include wires, conductors, or other similar electrical structures for electrically connecting to the coaxial cable 110. As such, the electrical connector 160 can receive the photocurrent from the coaxial cable 110. It is to be appreciated that the electrical connector 160 can include a number of different constructions that function to receive the photocurrent from the coaxial cable 110. As such, the electrical connector 160 is not specifically limited to the example shown in FIG. 4.

Figure 5:
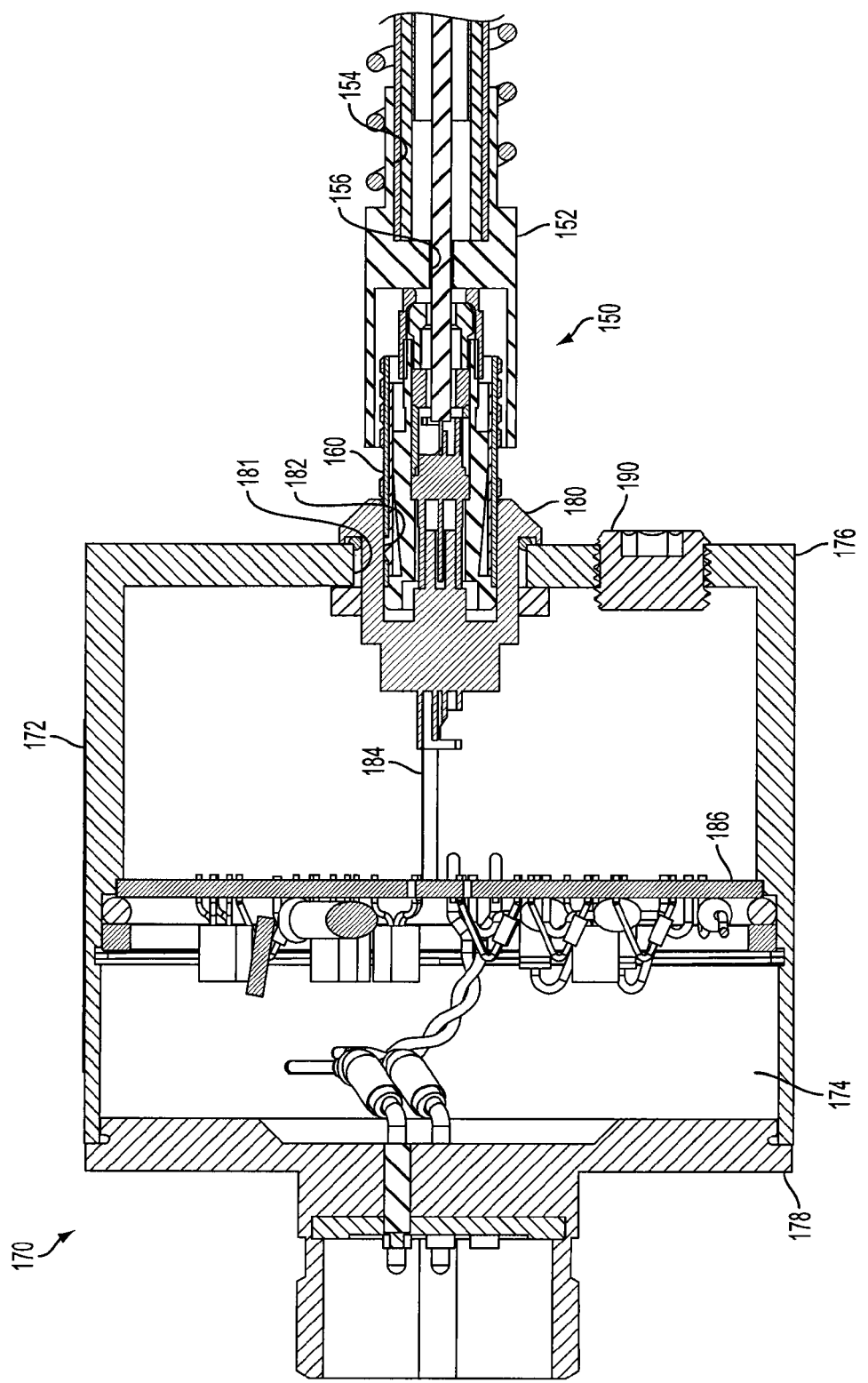
FIG. 5 is a sectional view of an example electrical assembly along lines 5-5 of FIG. 1.

Referring now to FIG. 5, a cross-sectional view along line 5-5 of FIG. 1 is shown, depicting an example of the electrical assembly 170. The electrical assembly 170 is positioned outside of the turbine 12 and spaced a distance apart from the combustion chamber 10. Accordingly, the electrical assembly 170 can be positioned in a location that has a lower temperature than within the turbine 12, such that electronics can be used in the electrical assembly 170 without being subjected to relatively high temperatures.

The electrical assembly 170 includes a housing 172 defining an internal chamber 174 that is substantially hollow. The housing 172 extends between a first end portion 176 and a second end portion 178 opposite the first end portion 176. It is to be appreciated that the electrical assembly 170 shown in FIG. 5 includes only one possible construction, as a number of sizes, shapes, and configurations are envisioned.

The electrical assembly 170 further includes a connector receptacle 180. The connector receptacle 180 extends through an opening 181 in the housing 172. The connector receptacle 180 can be generally circular in size, though other sizes and shapes are envisioned. The connector receptacle 180 can be fixedly attached to the opening 181 of the housing 172, such that the connector receptacle 180 is limited from being removed. In further examples, the connector receptacle 180 can be attached to the housing 172 in a number of ways, such as by welding, adhesives, mechanical fasteners, etc. The connector receptacle 180 could also include one or more sealing structures, such as O-rings or the like, such that the connector receptacle 180 forms a seal with the housing 172 to limit and/or prevent the passage of air, moisture, condensation, etc. through the opening 181.

The connector receptacle 180 can attach (e.g., electrically connect) to the connector assembly 150. As such, the connector receptacle 180 receives the photocurrent from the cable assembly 100. In particular, the connector receptacle 180 is sized and shaped to substantially match a size and shape of the electrical connector 160. The connector receptacle 180 includes a bore 182 extending axially into the connector receptacle 180. The bore 182 is sized and shaped to receive the electrical connector 160. For example, the bore 182 has a shape that substantially matches a corresponding shape of the electrical connector 160, such that the electrical connector 160 can readily be inserted into the bore 182. It is to be appreciated that the shown example comprises merely one possible example of electrically connecting the electrical assembly 170 to the cable assembly 100. Indeed, the electrical assembly 170 can be attached to the cable assembly 100 in any number of ways, and is not specifically limited to including the connector receptacle 180 as shown.

The connector receptacle 180 further includes one or more connecting wires 184. The connecting wires 184 are somewhat generically depicted in FIG. 5, as it is to be understood that the connecting wires 184 could include any number of structures (e.g., wires, cables, etc.) that are electrically connected to the connector receptacle 180. Indeed, the connecting wires 184 are capable of receiving the photocurrent from the cable assembly 100 through the connector receptacle 180.

The electrical assembly 170 further includes a circuit board 186 including electrical hardware. The circuit board 186 extends across the internal chamber 174 of the housing 172. The circuit board 186 can be attached in any number of ways within the housing 172, including with mechanical fasteners, adhesives, snap fit means, etc. The circuit board 186 is attached (e.g., electrically connected) to the connecting wires 184. As such, the circuit board 186 can receive the photocurrent from the connecting wires 184.

The circuit board 186 includes electrical hardware, such as an amplifier circuit. The amplifier circuit is shown somewhat generically in FIG. 5, and could include any number of configurations not limited to FIG. 5. The photocurrent is received by the amplifier circuit, and then is processed and amplified by signal circuitry to produce an electrical signal. In one example, the photocurrent can be amplified and converted into a current in a range of about 4 milliamperes (mA) to about 20 milliamperes.

This electrical signal in the form of a current is indicative of the specific characteristics of the flame 8. These characteristics include, but are not limited to, the presence or absence of the flame 8 within the combustion chamber 10. In the event of a flame-out condition wherein the flame 8 has been extinguished, the absence of electromagnetic radiation energy at the photodiode 60 is detected. The absence of electromagnetic radiation energy will cause the photodiode 60 to provide an electrical signal in the form of the photocurrent that is low or zero. This photocurrent is delivered through the cable assembly 100 and to the amplifier circuit on the circuit board 186. This photocurrent is amplified and converted into a current that is indicative of the flame's characteristics (e.g., flame-out condition). This electrical signal can then be sent to a fuel control apparatus, or the like, that can reduce and/or stop the supply of fuel through the fuel nozzle 13 and into the combustion chamber 10. As such, the electrical signal from the photodiode 60 can be used to control the supply of fuel into the fuel nozzle 13.

To protect the electrical circuitry within the electrical assembly 170, the internal chamber 174 can, in one example, be sealed and backfilled with a gas, including a dry inert gas such as argon. By filling the internal chamber 174 with the gas, the internal chamber 174 limits and reduces the entrance of moisture, condensation, gases, or the like. To fill the internal chamber 174, the electrical assembly 170 can be provided with a purge opening 190. The purge opening 190 can assist in backfilling the electrical assembly 170 with the dry inert gas. The purge opening 190 is positioned at the first end portion 176 of the housing 172, though the purge opening 190 is not limited to such a location. Rather, the purge opening 190 could be positioned laterally on a side of the housing 172, closer to the second end portion 178, or the like. In operation, purge opening 190 can be in fluid communication with a gas supply that can supply the dry inert gas. Once the dry inert gas has been supplied through the purge opening 190 and into the internal chamber 174, the purge opening 190 can be closed and sealed. In the shown example of FIG. 5, the purge opening 190 can be sealed by means of a threaded insert structure, though a number of sealing structures are envisioned. As such, the electrical assembly 170 is not limited to the purge opening 190 in the shown example.

Referring now to FIG. 1, the operation of the flame sensor apparatus 6 will now be described in more detail. Fuel is provided to the combustion chamber 10 through the fuel nozzle 13, producing the flame 8. A sight tube 15 projects a distance outwardly from the combustion chamber 10 and defines an optical path from the sight tube 15 towards the flame 8. The sensor assembly 30 is attached to the sight tube, such that the sensor assembly 30 is spaced a distance away from the combustion chamber 10.

Electromagnetic radiation energy, indicative of the specific characteristics of the flame 8, is conveyed from the flame 8 in the combustion chamber 10, through the sight tube 15 and into the sensor assembly 30. The lens 42 (shown in FIG. 3) focuses the electromagnetic radiation energy in the sensor assembly 30 onto the photodiode 60. In response, the photodiode 60 produces an electrical signal based on the intensity of the electromagnetic radiation energy. This electrical signal can be in the form of a photocurrent that is indicative of the specific characteristics of the flame 8, including, but not limited to, the presence or absence of the flame.

The cable assembly 100 conveys the photocurrent from the sensor assembly 30 to the electrical assembly 170. In particular, the photocurrent passes through the coaxial cable 110 that is includes as part of a sealed array. This photocurrent can travel along the length of the cable assembly 100 from the first cable end 102 to the second cable end 103. The relatively small photocurrent is protected from triboelectric noise, electromagnetic interference, and signal degradation in a number of ways. For example, since the coaxial cable 110 is a low noise cable, signal degradation is reduced. Further, the cable assembly 100 is sealed with a dry inert gas, further limiting the effects of moisture, condensation, gas, etc. on the coaxial cable 110. In addition, the cable assembly 100 includes the sock layer 122, conduit layer 124, and armored braid layer 126. These layers can further assist in reducing the effects of triboelectric noise and electromagnetic interference. As such, integrity of the photocurrent can be maintained as the photocurrent is conveyed along the cable assembly 100.

As shown in FIG. 5, the photocurrent at the second cable end 103 passes through a connector assembly 150 that is electrically connected to the electrical assembly 170. The photocurrent passes from the connector assembly 150, through the connector receptacle 180, and to the circuit board 186. The amplifier circuit that is attached to the circuit board 186 receives and amplifies the photocurrent. In response, an electrical signal is produced, such as a current in the range of about 4 milliamperes to about 20 milliamperes. This electrical signal in the form of a current indicates specific characteristics of the flame 8, such as the presence or absence of the flame. As such, in the event of a flame-out condition when the flame 8 has been extinguished, the current output is low or zero. This current output can trigger the fuel control apparatus to reduce and/or stop the supply of fuel into the combustion chamber 10.

The electrical assembly 170 is positioned a distance away from the combustion chamber 10 outside of the turbine 12. As such, the electrical assembly 170 is not located within the relatively high temperature/vibration environment of the turbine 12. Accordingly, the electrical assembly 170 is electrically remote from the photodiode 60 in the sensor assembly 30. The electrical assembly 170 is subjected to relatively lower temperatures/vibrations than the photodiode 60 in the sensor assembly 30.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A flame sensor apparatus for flame sensing within a turbine, the apparatus including:
   a sensor assembly entirely located within the turbine at a first location, which is within the turbine, having a first, relatively elevated temperature, the sensor assembly including a photodiode, at the first location, for sensing characteristics of a flame within a combustion chamber of the turbine, the combustion chamber having an outer wall and an opening within the outer wall, the sensor assembly being located outside of the combustion chamber and sensing characteristics of the flame within the combustion chamber of the turbine through the opening, the photodiode outputting an electrical photocurrent that has an electrical current value that is indicative of the characteristics of the flame and the sensor assembly including an electrical wire, at the first location, electrically connected to the photodiode to receive the electrical photocurrent output from the photodiode and electrically convey the electrical photocurrent;

an electrical assembly that is electrically remote from the sensor assembly at a second location, outside of the turbine away from the first location, and having a second temperature relatively lower than the first temperature at the first location; and an electric cable assembly extending from the sensor assembly, at the first location, to the electrical assembly, at the second location, and transitioning from the first location having the relatively elevated temperature to the second location having the relatively lower temperature, the electric cable assembly including an electrical cable electrically connected to the electrical wire of the sensor assembly and being configured to electrically convey the photocurrent, that is indicative of the characteristics of the flame, from the photodiode, and electrically conveyed by the electrical wire of the sensor assembly, to the electrical assembly.

2. The flame sensor apparatus of claim 1, wherein the characteristics of the flame include the presence and absence of the flame within the combustion chamber.

3. The flame sensor apparatus of claim 1, wherein the sensor assembly includes a lens positioned within an internal chamber of the sensor assembly, the lens being configured to focus electromagnetic radiation energy from the combustion chamber onto the photodiode.

4. The flame sensor apparatus of claim 3, wherein the photodiode includes a silicon carbide photodiode.

5. The flame sensor apparatus of claim 4, wherein the silicon carbide photodiode is configured to convert the electromagnetic radiation energy into an electrical signal in the form of the photocurrent.

6. The flame sensor apparatus of claim 5, wherein the electric cable assembly is configured to convey the photocurrent from the silicon carbide photodiode to the electrical assembly.

7. The flame sensor apparatus of claim 6, wherein the electrical assembly is configured to convert the photocurrent into a current output in a range of 4 milliamperes to 20 milliamperes, the current output being indicative of the characteristics of the flame.

8. The flame sensor apparatus of claim 1, wherein the electric cable assembly is attached at one end to the sensor assembly and attached at an opposing second end to the electrical assembly.

9. The flame sensor apparatus of claim 8, wherein the electric cable assembly is sealed and filled with an inert gas.

10. The flame sensor apparatus of claim 1, further including a sight tube having first and second ends, the sight tube being attached at the first end portion to the combustion chamber within the turbine and attached at the second end portion to the sensor assembly, and the sensor assembly receiving electromagnetic radiation energy from the flame through the sight tube.

11. A flame sensor apparatus for flame sensing within a turbine, the apparatus including:

a sensor assembly entirely located within the turbine at a first location, which is within the turbine, having a first, relatively elevated temperature, the sensor assembly including a photodiode, at the first location, for sensing characteristics of a flame within a combustion chamber of the turbine, the combustion chamber having an outer wall and an opening within the outer wall, the sensor assembly being located outside of the combustion chamber and sensing characteristics of the flame within the combustion chamber of the turbine through the opening, the photodiode outputting an electrical photocurrent that has an electrical current value that is indicative of the characteristics of the flame and the sensor assembly including an electrical wire, at the first location, electrically connected to the photodiode to receive the electrical photocurrent output from the photodiode and electrically convey the electrical photocurrent;

an electrical assembly that is electrically remote from the sensor assembly and the combustion chamber at a second location, outside of the turbine away from the first location, and having a second temperature relatively lower than the first temperature at the first location; and an electric cable assembly extending from the sensor assembly, at the first location, to the electrical assembly, at the second location, and transitioning from the first location having the relatively elevated temperature to the second location having the relatively lower temperature, the electric cable assembly including an electrical cable electrically connected to the electrical wire of the sensor assembly and being configured to electrically convey the photocurrent, that is indicative of the characteristics of the flame, from the photodiode, and electrically conveyed by the electrical wire of the sensor assembly, to the electrical assembly, wherein the electric cable assembly is included as part of a sealed array filled with an inert gas.

12. The flame sensor apparatus of claim 11, further including a sight tube projecting from the combustion chamber and defining an optical path from the flame and through the sight tube.

13. The flame sensor apparatus of claim 12, wherein a first end of the sensor assembly is attached to the sight tube.

14. The flame sensor apparatus of claim 13, wherein the sensor assembly includes a lens positioned within an internal chamber of the sensor assembly, the lens being positioned between the first end of the sensor assembly on one side and the photodiode on an opposing second side.

15. The flame sensor apparatus of claim 14, wherein the lens is configured to focus the electromagnetic radiation energy from the combustion chamber onto the photodiode.

16. The flame sensor apparatus of claim 11, wherein the electric cable assembly is in a range of 9.1 to 10.7 meters in length.

17. A method of flame sensing within a turbine, including the steps of:

providing a flame sensor apparatus for flame sensing within the turbine, said step of providing the flame sensor apparatus includes providing the flame sensor apparatus to include:

a sensor assembly entirely located within the turbine at a first location, which is within the turbine, having a first, relatively elevated temperature, the sensor assembly including a photodiode, at the first location, for sensing characteristics of a flame within a combustion chamber of the turbine, the combustion chamber having an outer wall and an opening within the outer wall, the sensor assembly being located outside of the combustion chamber and sensing characteristics of the flame within the combustion chamber of the turbine through the opening, the photodiode outputting an electrical photocurrent that has an electrical current value that is indicative of the characteristics of the flame and the sensor assembly including an electrical wire, at the first location, electrically connected to the photodiode to receive the electrical photocurrent output from the photodiode and electrically convey the electrical photocurrent;

an electrical assembly that is electrically remote from the sensor assembly and the combustion chamber, and that is at a second location, outside of the turbine away from the first location, and having a second temperature relatively lower than the first temperature at the first location; and an electric cable assembly extending from the sensor assembly, at the first location, to the electrical assembly, at the second location, and transitioning from the first location having the relatively elevated temperature to the second location having the relatively lower temperature, the electric cable assembly including an electrical cable electrically connected to the electrical wire of the sensor assembly and being configured to electrically convey the photocurrent, that is indicative of the characteristics of the flame, from the photodiode, and electrically conveyed by the electrical wire of the sensor assembly, to the electrical assembly;

receiving electromagnetic radiation from the flame with the photodiode;

producing the photocurrent corresponding to the electromagnetic radiation with the photodiode;

conveying the photocurrent via the electrical cable of the electric cable assembly to the electrical assembly; and sensing the characteristics of the flame with the electrical assembly based on the photocurrent.

18. The method of claim 17, further including the step of sealing opposing ends of the electric cable assembly and filling the electric cable assembly with an inert gas.

19. The method of claim 17, further including the step of converting the photocurrent into an electrical signal in the form of a current output in a range of 4 milliamperes to 20 milliamperes, the current output being indicative of the characteristics of the flame.

20. The method of claim 17, wherein the characteristics of the flame include the presence and absence of the flame within the combustion chamber.

\* \* \* \* \*